United States Patent
Cho (10) Patent No.: US 12,234,881 B2
(45) Date of Patent: Feb. 25, 2025

(54) SHOCK ABSORBER

(71) Applicant: HL Mando Corporation

(72) Inventor: Sangyeon Cho, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 388 days.

(21) Appl. No.: 17/871,172

(22) Filed: Jul. 22, 2022

(65) Prior Publication Data

US 2023/0235806 A1    Jul. 27, 2023

(30) Foreign Application Priority Data

Jan. 25, 2022    (KR) ........................ 10-2022-0010630

(51) Int. Cl.
| | | |
|---|---|---|
| F16F 9/49 | (2006.01) | |
| F16F 9/10 | (2006.01) | |
| F16F 9/348 | (2006.01) | |
| F16F 9/48 | (2006.01) | |
| B60G 13/08 | (2006.01) | |

(52) U.S. Cl.
CPC .............. *F16F 9/103* (2013.01); *F16F 9/348* (2013.01); *B60G 13/08* (2013.01); *F16F 2222/12* (2013.01)

(58) Field of Classification Search
CPC ..................................................... B60G 13/08
See application file for complete search history.

(56) References Cited

U.S. PATENT DOCUMENTS

| | | | | |
|---|---|---|---|---|
| 5,333,708 A * | 8/1994 | Jensen | ...................... | F16F 9/49 |
| | | | | 188/284 |
| 6,814,193 B2 * | 11/2004 | Grundei | ................... | F16F 9/061 |
| | | | | 188/322.22 |
| 10,962,081 B2 * | 3/2021 | Sankaran | ............... | B60G 13/08 |
| 11,796,024 B2 * | 10/2023 | Baek | ......................... | F16F 9/49 |
| 2003/0234146 A1 * | 12/2003 | Grundei | ................. | F16F 9/061 |
| | | | | 188/316 |
| 2020/0011395 A1 * | 1/2020 | Sankaran | .................. | F16F 9/49 |
| 2022/0373057 A1 * | 11/2022 | Baek | ........................ | F16F 9/16 |
| 2022/0381314 A1 * | 12/2022 | Lee | ............................ | F16F 9/18 |
| 2023/0135744 A1 * | 5/2023 | Baek | ......................... | F16F 9/18 |
| | | | | 188/284 |
| 2023/0287953 A1 * | 9/2023 | Baek | ......................... | F16F 9/48 |
| 2023/0287956 A1 * | 9/2023 | Baek | .................... | F16F 13/007 |

* cited by examiner

*Primary Examiner* — Thomas W Irvin
(74) *Attorney, Agent, or Firm* — Hauptman Ham, LLP (57) ABSTRACT

A shock absorber includes a piston valve, a body valve installed at a lower side of a tube, a lower guide member installed between the piston valve and the body valve and including a lower through-hole through which the fluid passes, and a lower passing slit formed to allow the fluid to pass therethrough at a flow rate relatively lower than a flow rate at which the fluid passes through the lower through-hole, a mid-guide member having a mid-guide hole through which the fluid passes, the mid-guide member being disposed between the piston valve and the lower guide member and configured to close the lower through-hole when the mid-guide member is in contact with the lower guide member, a first elastic member interposed between the lower guide member and the mid-guide member, and a second elastic member interposed between the piston valve and the mid-guide member.

23 Claims, 6 Drawing Sheets

SHOCK ABSORBER

CROSS-REFERENCE TO RELATED APPLICATIONS

This application claims benefit and priority to Korean Patent Application No. 10-2022-0010630, filed on Jan. 25, 2022, with the Korean Intellectual Property Office, the disclosure of which is incorporated herein in its entirety by reference.

TECHNICAL FIELD

The present disclosure relates to a shock absorber, and more particularly, to a shock absorber used for a suspension system for a vehicle.

BACKGROUND

In general, a shock absorber is called a damper and refers to a device installed in a vehicle to absorb and attenuate impact or vibration applied to an axle from a road surface while the vehicle travels.

The shock absorber includes a cylinder filled with oil, a piston rod connected to a vehicle body side and configured to reciprocate, a piston valve connected to a lower end of the piston rod and configured to slide in the cylinder and control a flow of a fluid, and a body valve installed at a lower end of the cylinder and configured to face the piston valve.

An interior of the cylinder is divided into a compression chamber and an extension chamber by the piston valve, and a compression flow path and an extension flow path are penetratively formed in a vertical direction in the piston valve. Therefore, the piston valve generates a damping force by using a resistive force of a fluid while reciprocating in directions of compression and extension processes. In addition, the fluid generates a damping force while passing through the body valve during the compression and extension processes of the piston valve.

Therefore, the shock absorber may increase durability life by reducing dynamic stress of respective components of a vehicle body, ensure grounding properties of a tire by inhibiting a motion of the mass, and improve motional performance of a vehicle by inhibiting a change in posture caused by an inertial force.

However, when the shock absorber generates the damping force only by using a pressure of the fluid, a size of the shock absorber needs to be increased to increase the damping force. Therefore, there is a continual effort to increase the damping force while keeping the shock absorber compact.

SUMMARY

The present disclosure has been made in an effort to provide a shock absorber capable of increasing a damping force while having a simple configuration.

An embodiment of the present disclosure provides a shock absorber including: a tube having an interior filled with a fluid; a piston valve configured to be movable upward and downward in the tube and having a flow path through which the fluid flows; a body valve installed at a lower side of the tube and having a flow path through which the fluid flows; a lower guide member installed between the piston valve and the body valve and including a lower through-hole through which the fluid passes, and a lower passing slit formed to allow the fluid to pass therethrough at a flow rate relatively lower than a flow rate at which the fluid passes through the lower through-hole; a mid-guide member having a mid-guide hole through which the fluid passes, the mid-guide member being disposed to be movable upward and downward between the piston valve and the lower guide member and configured to close the lower through-hole when the mid-guide member is in contact with the lower guide member; a first elastic member interposed between the lower guide member and the mid-guide member; and a second elastic member interposed between the piston valve and the mid-guide member and having a relatively larger elastic modulus than the first elastic member.

When the piston valve moves downward during a compression process, the fluid between the piston valve and the body valve may flow to the flow path of the piston valve or flow to the flow path of the body valve through the lower through-hole and the lower passing slit of the lower guide member, and when the mid-guide member comes into contact with the lower guide member as the first elastic member is compressed before the second elastic member is compressed as the piston valve moves downward, the lower through-hole of the lower guide member may be closed, and the fluid may flow to the flow path of the body valve through the lower passing slit.

When the mid-guide member being in contact with the lower guide member is moved away from the lower guide member by an elastic force of the first elastic member as the piston valve moves upward during an extension process, the lower through-hole of the lower guide member may be opened, and the fluid may flow through the lower through-hole and the lower passing slit.

The shock absorber may further include an upper guide member provided to be movable upward and downward between the piston valve and the second elastic member.

The upper guide member may include: an upper guide body having an upper guide hole penetratively formed in a central portion thereof; a plurality of upper guide protrusions protruding from one side of the upper guide body toward the piston valve so that the plurality of upper guide protrusions comes into contact with the piston valve; and a plurality of upper guide flow paths formed between the plurality of upper guide protrusions.

The shock absorber may further include a piston rod configured to support the piston valve and having one end protruding while penetrating the piston valve. Further, at least a part of one end of the piston rod may be inserted into the upper guide hole of the upper guide body.

When the piston valve moves downward during a compression process, the fluid between the piston valve and the body valve may flow to the flow path of the piston valve and the flow path of the body valve, and in which when the upper guide protrusion comes into contact with the piston valve and one end of the piston rod is inserted into the upper guide hole as the piston valve moves downward, the fluid may flow to the flow path of the piston valve through the upper guide flow paths.

Another embodiment of the present disclosure provides a shock absorber including: a first tube having an interior filled with a fluid; a piston valve provided to be movable upward and downward in the first tube and configured to divide the interior of the first tube into a compression chamber disposed at a lower side thereof and a rebound chamber disposed at an upper side thereof, the piston valve being configured to adjust a flow of the fluid between the compression chamber and the rebound chamber; a second tube configured to surround the first tube and define a reserve chamber between the first tube and the second tube; a body valve installed at the lower side of the first tube and configured to adjust a flow of the fluid between the compression chamber and the reserve chamber; a lower guide member installed between the piston valve and the body valve and including a lower through-hole through which the fluid passes, and a lower passing slit formed to allow the fluid to pass therethrough at a flow rate relatively lower than a flow rate at which the fluid passes through the lower through-hole; a mid-guide member having a mid-guide hole through which the fluid passes, the mid-guide member being disposed to be movable upward and downward between the piston valve and the lower guide member and configured to close the lower through-hole when the mid-guide member is in contact with the lower guide member; a first elastic member interposed between the lower guide member and the mid-guide member; and a second elastic member interposed between the piston valve and the mid-guide member and having a relatively larger elastic modulus than the first elastic member.

When the piston valve moves downward during a compression process, the fluid in the compression chamber may flow to the rebound chamber through the piston valve or flow to the reserve chamber via the body valve through the lower through-hole and the lower passing slit of the lower guide member, and when the mid-guide member comes into contact with the lower guide member as the first elastic member is compressed before the second elastic member is compressed as the piston valve moves downward, the lower through-hole of the lower guide member may be closed, and the fluid may flow to the reserve chamber through the lower passing slit.

When the mid-guide member being in contact with the lower guide member is moved away from the lower guide member by an elastic force of the first elastic member as the piston valve moves upward during an extension process, the lower through-hole of the lower guide member may be opened, and the fluid may flow through the lower through-hole and the lower passing slit.

The shock absorber may further include an upper guide member provided to be movable upward and downward between the piston valve and the second elastic member.

The upper guide member may include: an upper guide body having an upper guide hole penetratively formed in a central portion thereof; a plurality of upper guide protrusions protruding from one side of the upper guide body toward the piston valve so that the plurality of upper guide protrusions comes into contact with the piston valve; and a plurality of upper guide flow paths formed between the plurality of upper guide protrusions.

The shock absorber may further include a piston rod configured to support the piston valve and having one end protruding while penetrating the piston valve. Further, at least a part of one end of the piston rod may be inserted into the upper guide hole of the upper guide body.

When the piston valve moves downward during a compression process, the fluid in the compression chamber may flow to the rebound chamber and the reserve chamber, and when the upper guide protrusion comes into contact with the piston valve and one end of the piston rod is inserted into the upper guide hole as the piston valve moves downward, the fluid may flow to the rebound chamber through the upper guide flow path.

The upper guide member may have a first upper support groove configured to support one end of the second elastic member, and the mid-guide member may have a second upper support groove configured to support the other end of the second elastic member.

The lower guide member may have a first lower support groove configured to support one end of the first elastic member, and the mid-guide member may have a second lower support groove configured to support the other end of the first elastic member.

The first elastic member and the second elastic member may be coil springs disposed in series.

The first elastic member may be a coil spring having a diameter that decreases in a direction from one end of the first elastic member, which is in contact with the lower guide member, to the other end of the first elastic member, which is in contact with the mid-guide member.

The shock absorber may further include a piston ring disposed on an outer peripheral surface of the mid-guide member.

A ring accommodation groove may be formed in the outer peripheral surface of the mid-guide member, and the piston ring may be inserted into the ring accommodation groove.

The shock absorber may further include a base tube configured to maintain a spacing distance between the lower guide member and the body valve.

The lower passing slit may be recessed in one surface of the lower through-hole.

The lower through-hole of the lower guide member may be provided in the form of a long hole having an arc shape, and the lower passing slit may be formed in one surface of the lower through-hole in a direction of a center of the arc shape of the lower through-hole.

According to the embodiment of the present disclosure, the shock absorber may increase the damping force and improve durability while having the simple configuration.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Unless otherwise defined, all technical and scientific terms used in the present specification have meanings generally understood by those skilled in the art to which the present disclosure pertains. All terms used in the present specification are selected for the purpose of more clearly explaining the present disclosure but not selected to restrict the scope of the present disclosure.

The expressions "include," "provided with," "have" and the like used in the present specification should be understood as open-ended terms connoting the possibility of inclusion of other embodiments unless otherwise mentioned in a phrase or sentence including the expressions.

A singular expression can include the meanings of the plurality unless otherwise mentioned, and the same applies to a singular expression stated in the claims.

The terms "first," "second," and the like used in the present specification are used to identify a plurality of constituent elements from one another and are not intended to limit the order or importance of the relevant constituent elements.

Hereinafter, a shock absorber 101 according to an embodiment of the present disclosure will be described with reference to FIGS. 1 to 6.

The shock absorber 101 according to the embodiment of the present disclosure is called a damper. For example, the shock absorber 101 may be installed in a vehicle and used to absorb and attenuate impact or vibration applied to an axle from a road surface while a vehicle travels.

Figure 1:
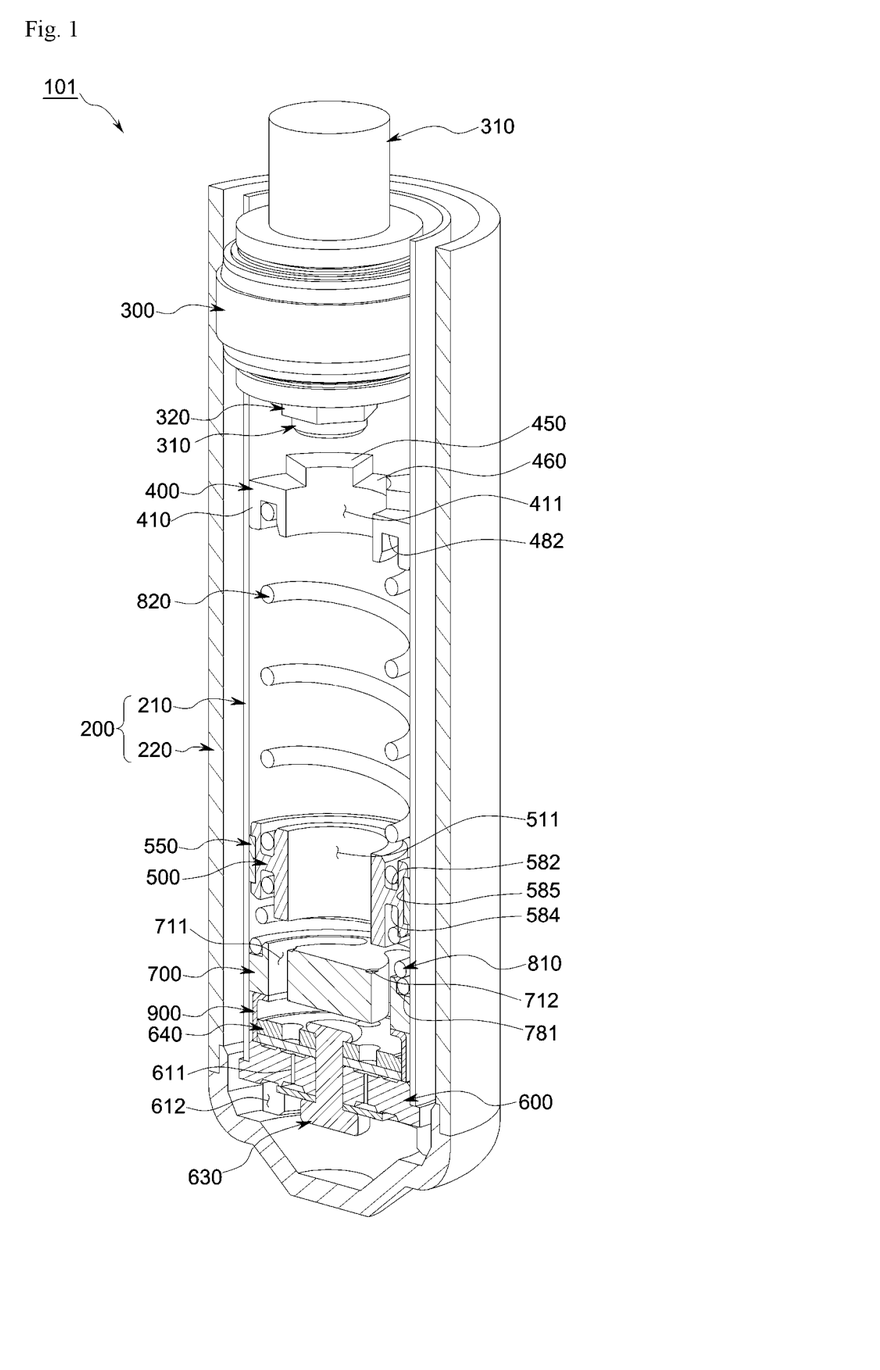
FIG. 1 is a cross-sectional perspective view illustrating a shock absorber according to an embodiment of the present disclosure.
Figure 2:
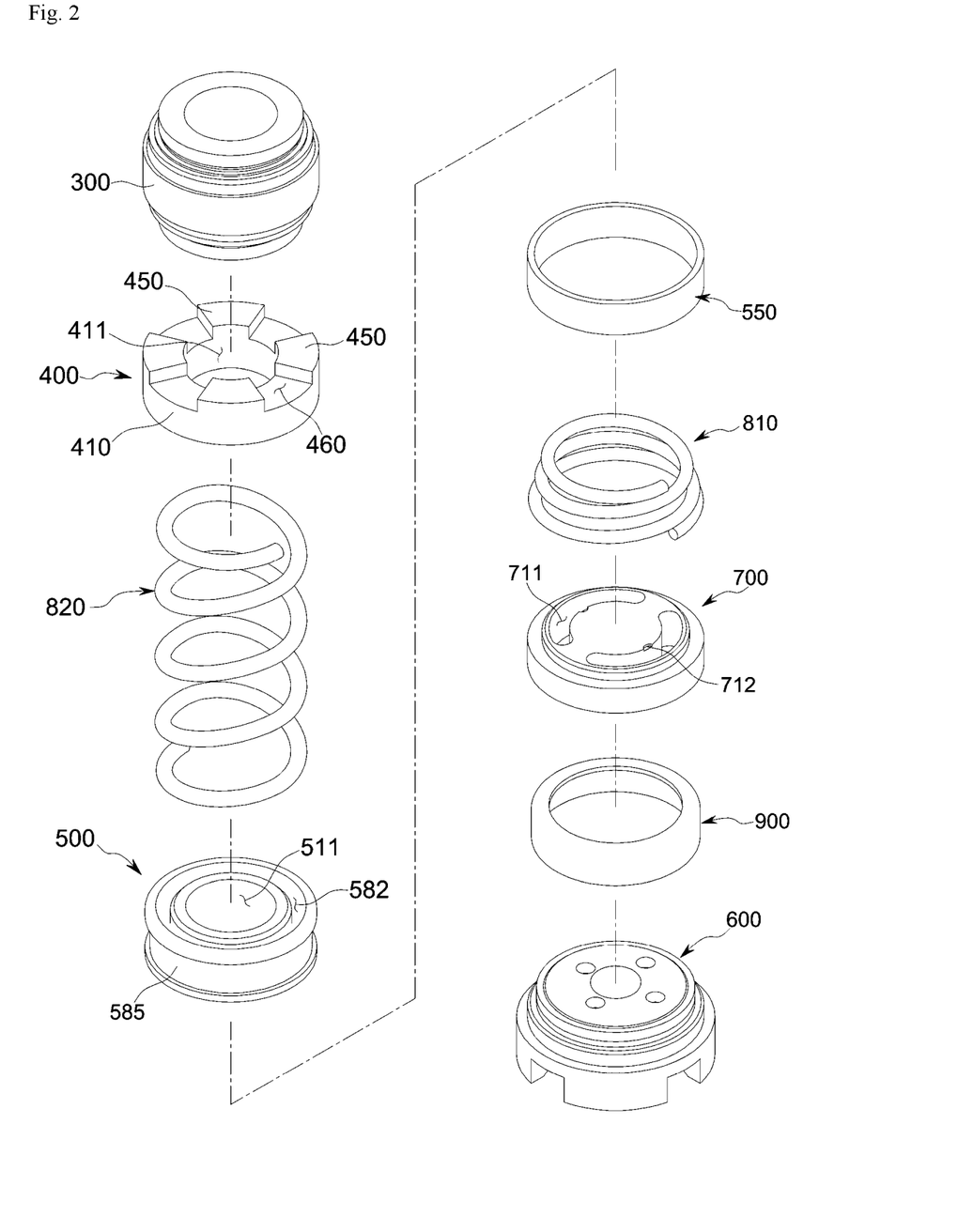
FIG. 2 is an exploded perspective view illustrating internal components of the shock absorber illustrated in FIG. 1.
Figure 3:
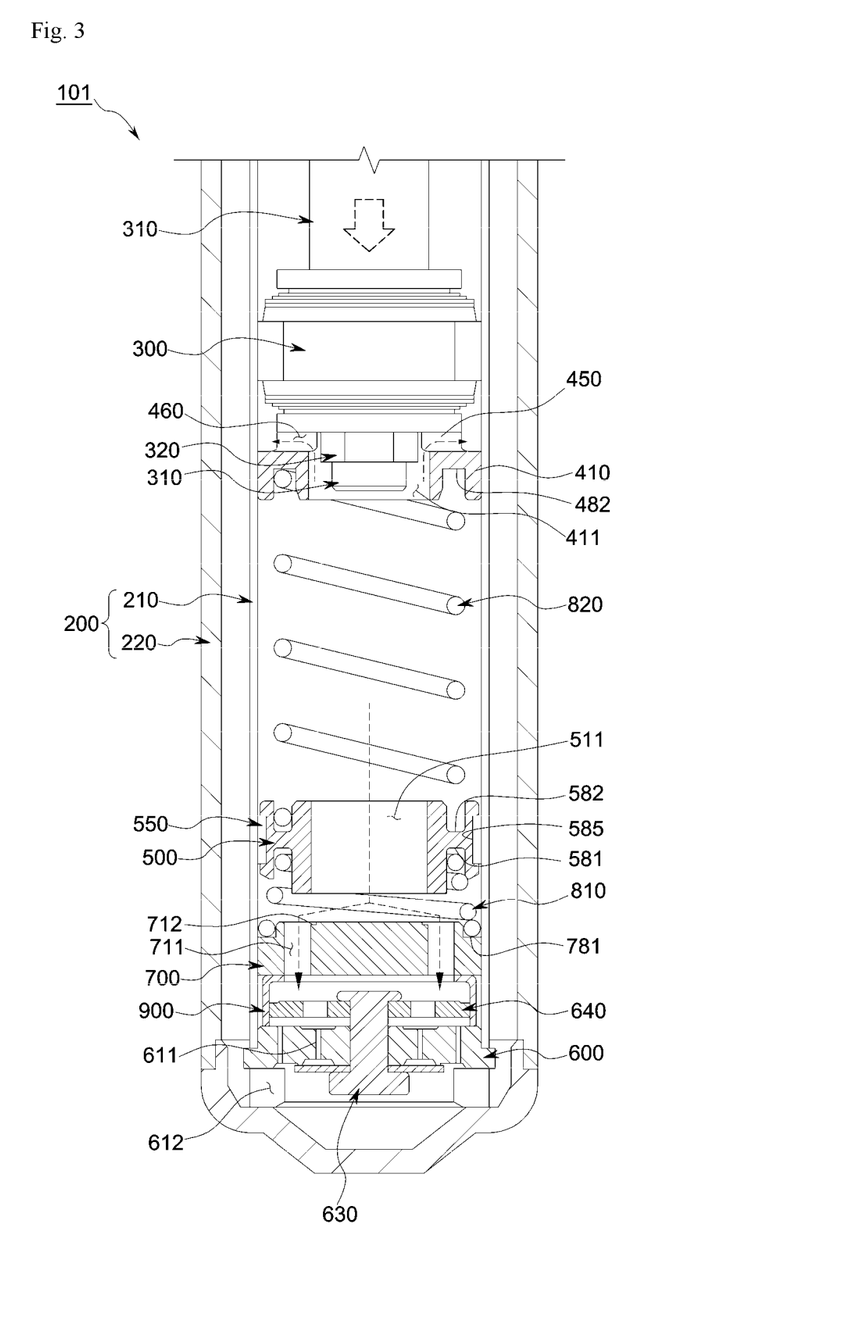
FIGS. 3 and 4 are cross-sectional views illustrating a compression process of the shock absorber illustrated in FIG. 1.

As illustrated in FIGS. 1 to 3, the shock absorber 101 according to the embodiment of the present disclosure includes a tube 200, a piston valve 300, a body valve 600, a lower guide member 700, a mid-guide member 500, a first elastic member 810, and a second elastic member 820.

The shock absorber 101 according to the embodiment of the present disclosure may further include an upper guide member 400, a piston rod 310, a piston ring 550, and a base tube 900.

The shock absorber 101 may further include a piston nut 320, a body pin 630, and a retainer 640.

The interior of the tube 200 is filled with a fluid. For example, the tube 200 may include a first tube 210 and a second tube 220. The piston valve 300 to be described below is disposed in the first tube 210 and configured to be movable upward and downward. The interior of the first tube 210 may be divided into a compression chamber and a rebound chamber by the piston valve 500. Specifically, based on the piston valve 500, the rebound chamber may be disposed at an upper side of the first tube 210, and the compression chamber may be disposed at a lower side of the first tube 210. The second tube 220 surrounds the first tube 210 with a separation space interposed therebetween, such that a reserve chamber may be defined between the second tube 220 and the first tube 210.

As described above, the piston valve 300 may be provided to be movable upward and downward in the first tube 210 and divide the interior of the first tube 210 into the compression chamber disposed at the lower side thereof and the rebound chamber disposed at the upper side thereof. Further, although not illustrated, a flow path may be formed in the piston valve 300 so that the fluid may flow between the compression chamber and the rebound chamber. That is, the piston valve 300 may have the flow path through which the fluid passes, and the piston valve 300 may adjust the flow of the fluid between the compression chamber and the rebound chamber.

The piston rod 310 may support the piston valve 300. Specifically, one end of the piston rod 310 may protrude while penetrating the piston valve 300. Further, one end of the protruding piston rod 310 may be coupled to the piston valve 300 by means of the piston nut 320. That is, the piston nut 320 may prevent the piston valve 300 from separating from the piston rod 310. In this case, at least a part of one protruding end of the piston rod 310 may be inserted into an upper guide hole 411 of the upper guide member 400 to be described below.

The body valve 600 may be installed at the lower side of the first tube 210 and adjust the flow of the fluid between the compression chamber and the reserve chamber. That is, a flow path may be formed in the body valve 600 so that the fluid may flow between the compression chamber and the reserve chamber.

Specifically, body valve flow paths 611 may be formed in a bottom surface of the body valve 600 that faces the compression chamber. The body valve flow paths 611 may be connected to the compression chamber. Further, body connection holes 612 may be formed in a lateral surface of a lower portion of the body valve 600 that faces the reserve chamber. The body connection holes 612 may be connected to the reserve chamber. Further, the body valve flow path 611 may communicate with the body connection hole 612. That is, the fluid may flow from the compression chamber to the reserve chamber or from the reserve chamber to the compression chamber through the body valve flow paths 611 and the body connection holes 612. In addition, the body valve flow path 611 may be provided in plural, and the body connection hole 612 may be provided in plural.

The retainer 640 may be disposed on one surface of the body valve 600 that faces the lower guide member 700 to be described below. For example, the retainer 640 may be provided in the form of a circular plate having through-holes connected to the body valve flow paths 611 of the body valve 600.

The body pin 630 may be fastened while penetrating the body valve 600 and the retainer 640. For example, the body pin 630 may be a rivet and fastened to the body valve 600 and the retainer 640 by riveting. However, the embodiment of the present disclosure is not limited thereto. A head may be formed at one end of the body pin 630, and the body pin 630 may be fastened as a nut is coupled to the other end of the body pin 630.

With this structure, a basic damping force against impact or vibration may be generated as the fluid in the compression chamber flows to the rebound chamber through the piston valve 300 and flows to the reserve chamber through the body valve 600 during a compression process.

The lower guide member 700 may be installed between the piston valve 300 and the body valve 600. Specifically, the lower guide member 700 may include lower through-holes 711 through which the fluid passes, and lower passing slits 712 formed to allow the fluid to pass therethrough at a flow rate relatively lower than a flow rate at which the fluid passes through the lower through-hole 711. In this case, the lower passing slit 712 may be recessed in one surface of the lower through-hole 711. For example, the lower through-hole 711 of the lower guide member 700 may be provided in the form of a long hole having an arc shape, and the lower passing slit 712 may be formed in one surface of the lower through-hole 711 in a direction of a center of the arc shape of the lower through-hole 711.

In the embodiment of the present disclosure, when the mid-guide member 500 to be described below comes into contact with the lower guide member 700, the lower through-hole 711 may be closed, and a small amount of fluid may flow through the lower passing slit 712 formed in one region of the lower through-hole 711. As described above, a flow rate of the fluid, which may flow through the lower passing slit 712, is significantly lower than a flow rate of the fluid that may flow through the lower through-hole 711. That is, the lower passing slit 712 performs a similar function to an orifice.

For example, the lower through-hole 711 may be provided as a pair of lower through-holes, and the lower passing slit 712 may be provided as a pair of lower passing slits.

A first lower support groove 781 may be formed in one surface of the lower guide member 700 that faces the first elastic member 810 to be described below. The first lower support groove 781 may support one end of the first elastic member 810.

The mid-guide member 500 has a mid-guide hole 511 through which the fluid passes. The mid-guide member 500 may be movable upward and downward between the piston valve 300 and the lower guide member 700. That is, the mid-guide member 500 may be movable upward and downward in the compression chamber. In addition, the mid-guide member 500 may be disposed between the first elastic member 810 to be described below and the second elastic member 820 to be described below.

A ring accommodation groove 585 may be formed in an outer peripheral surface of the mid-guide member 500, and the piston ring 550 to be described below may be inserted into the ring accommodation groove 585.

The piston ring 550 is disposed on the outer peripheral surface of the mid-guide member 500 and prevents the fluid from flowing through a gap between the outer peripheral surface of the mid-guide member 500 and the inner peripheral surface of the first tube 210, thereby enabling the fluid only through the mid-guide hole 511.

For example, the piston ring 550 enables the fluid, which exists in a region in which the second elastic member 820 is disposed, to flow only through the mid-guide hole 511 of the mid-guide member 500 to a region in which the first elastic member 510 is disposed.

As described above, the piston ring 550 may be accommodated in the ring accommodation groove 585 of the mid-guide member 500.

In particular, in the embodiment of the present disclosure, when the mid-guide member 500 comes into contact with the lower guide member 700, the mid-guide member 500 blocks the lower through-hole 711 of the lower guide member 700. When the mid-guide member 500 blocks the lower through-hole 711 of the lower guide member 700 as described above, the fluid may flow only through the lower passing slit 712.

A second lower support groove 581 may be formed in one surface of the mid-guide member 500 that faces the first elastic member 810 to be described below. The second lower support groove 581 may support the other end of the first elastic member 810.

A second upper support groove 582 may be formed in the other surface of the mid-guide member 500 that faces the second elastic member 820 to be described below. The second upper support groove 582 may support the other end of the second elastic member 820.

As described above, one end of the first elastic member 810 to be described below may be supported by the first lower support groove 781 of the lower guide member 700, and the other end of the first elastic member 810 may be supported by the second lower support groove 581 of the mid-guide member 500. Further, one end of the second elastic member 820 to be described below may be supported by a first upper support groove 482 of the upper guide member 400, and the other end of the second elastic member 820 may be supported by the second upper support groove 582 of the mid-guide member 500.

As described above, the first lower support groove 781, the second lower support groove 581, the second upper support groove 582, and the first upper support groove 482 to be described below may prevent the first and second elastic members 810 and 820 to be described below from separating from exact positions while the first and second elastic members 810 and 820 are repeatedly compressed and extended.

The first elastic member 810 may be interposed between the lower guide member 700 and the mid-guide member 500.

The second elastic member 820 may be interposed between the piston valve 300 and the mid-guide member 500. More specifically, the second elastic member 820 may be interposed between the mid-guide member 500 and the upper guide member 400 to be described below.

As described above, both the first and second elastic members 810 and 820 may be disposed in the compression chamber in the first tube 210 and disposed in series with the mid-guide member 500 interposed therebetween. That is, based on the mid-guide member 500, the compression chamber may be divided into a region in which the first elastic member 810 is disposed and a region in which the second elastic member 820 is disposed.

The first elastic member 810 and the second elastic member 820 may be coil springs disposed in series. Further, the second elastic member 820 may have a relatively larger elastic modulus than the first elastic member 810. That is, a spring constant of the second elastic member 820 may be larger than a spring constant of the first elastic member 810. Therefore, when a pressure is simultaneously applied to the second elastic member 820 and the first elastic member 810, the first elastic member 810 may be compressed first, and then the second elastic member 820 may be compressed.

The first elastic member 810 may be a coil spring having a shape having a diameter that gradually decreases in a direction from one end of the first elastic member 810, which is in contact with the lower guide member 700, to the other end of the first elastic member 810, which is in contact with the mid-guide member 500. That is, it is possible to minimize a thickness of the first elastic member 810 in a state in which the first elastic member 810 is maximally compressed, i.e., a distance from one end to the other end of the first elastic member 810 in the state in which the first elastic member 810 is maximally compressed. Therefore, the configuration in which the mid-guide member 500 and the lower guide member 700 may come into contact with each other may be easily implemented even though the first elastic member 810 is interposed between the mid-guide member 500 and the lower guide member 700.

As described above, in the shock absorber 101 according to the embodiment of the present disclosure, the first elastic member 810 and the second elastic member 820 are disposed in the compression chamber in the first tube 210. Therefore, it is possible to use not only the damping force made by the fluid in the compression chamber but also the damping force made by the first and second elastic members 810 and 820 during the compression process.

As described above, the damping force may be generated by the first and second elastic members 810 and 820 and by the fluid in the compression chamber in the first tube 210 during the compression process of the shock absorber 101.

Therefore, the elastic moduli of the first and second elastic members 810 and 820 may be selectively determined at the time of designing the shock absorber 101 in consideration of an operational condition of the shock absorber 101 and the damping force and response sensitivity required to be provided by the shock absorber 101. Therefore, the damping force of the shock absorber 101 may be adjusted only by changing the first and second elastic members 810 and 820 without replacing and adding separate complicated components.

In a case in which the shock absorber 101 according to the embodiment of the present disclosure described above is applied to the vehicle, the shock absorber 101 may effectively stabilize the posture of the vehicle by generating a hydraulic pressure at a particular vehicle height. In particular, when the vehicle rattles or travels on a concave ground surface, the shock absorber may control the posture of the vehicle. Further, the shock absorber may stably maintain the posture of the vehicle when the vehicle is rapidly steered.

The base tube 900 may be installed at the lower side of the first tube 210 and maintain a spacing distance between the lower guide member 700 and the body valve 600. That is, the base tube 900 may allow the lower guide member 700 to be spaced apart from the body valve 600 at a predetermined distance or more.

The upper guide member 400 may be movable upward and downward between the piston valve 300 and the second elastic member 820. Specifically, the upper guide member 400 may be disposed between a lower portion of the piston valve 300 and one end of the second elastic member 820. When the upper guide member 400 is pressed by the piston valve 300 during the compression process of the shock absorber 101, the upper guide member 400 presses the second elastic member 820 while moving downward, i.e., a direction toward the body valve 600. That is, the upper guide member 400 transmits a pressure, which is generated by the movement of the piston valve 300, to the second elastic member 520.

Specifically, the upper guide member 400 may include an upper guide body 410, upper guide protrusions 450, and upper guide flow paths 460.

The upper guide body 410 may have an annular shape having a central portion in which an upper guide hole 411 is penetratively formed. In this case, at least a part of one end of the piston rod 310 may be inserted into the upper guide hole 411 of the upper guide body 410.

An outer peripheral surface of the upper guide body 410 may be moved along the inner peripheral surface of the first tube 210 in the compression chamber.

The upper guide protrusion 450 may protrude from one side of the upper guide body 410 toward the piston valve 300 so that the upper guide protrusion 450 may come into contact with the piston valve 300. In this case, the upper guide protrusion 450 may be provided in plural. Further, the plurality of upper guide protrusions 450 may be disposed to be spaced apart from one another in a circumferential direction around a center of the upper guide hole 411.

With this structure, when the piston valve 300 presses the upper guide member 400, upper surfaces of the upper guide protrusions 450 come into contact with the piston valve 300. Therefore, it is possible to reduce a contact area when the piston valve 300 and the upper guide member 400 come into contact with each other.

Because of the nature of the shock absorber 101, the piston valve 300 and the upper guide member 400 frequently come into contact with each other as the piston valve 300 moves upward and downward. The decrease in contact area between the piston valve 300 and the upper guide member 400 may reduce noise caused by the contact between the piston valve 300 and the upper guide member 900.

The upper guide flow paths 460 may be formed between the plurality of upper guide protrusions 450. Specifically, the upper guide flow path 460 may be defined by a difference in height between the upper guide body 410 and the upper guide protrusion 450 protruding from the upper guide body 410 and a spacing distance between the plurality of upper guide protrusions 450. That is, when the upper guide protrusion 450 is provided in plural, the upper guide flow path 460 may also be provided in plural.

As described above, the upper guide flow paths 460 may be formed between the upper guide protrusions 450 and guide the flow of the fluid. For example, when the upper guide protrusions 450 come into contact with the piston valve 300 and one end of the piston rod 310 is inserted into the upper guide hole 411 as the piston valve 300 moves downward, the fluid may flow from the compression chamber to the rebound chamber through the upper guide flow paths 460.

Meanwhile, as described above, the first upper support groove 482 may be formed in the other surface of the upper guide body 410 of the upper guide member 400. The first upper support groove 482 may support one end of the second elastic member 820.

Figure 4:
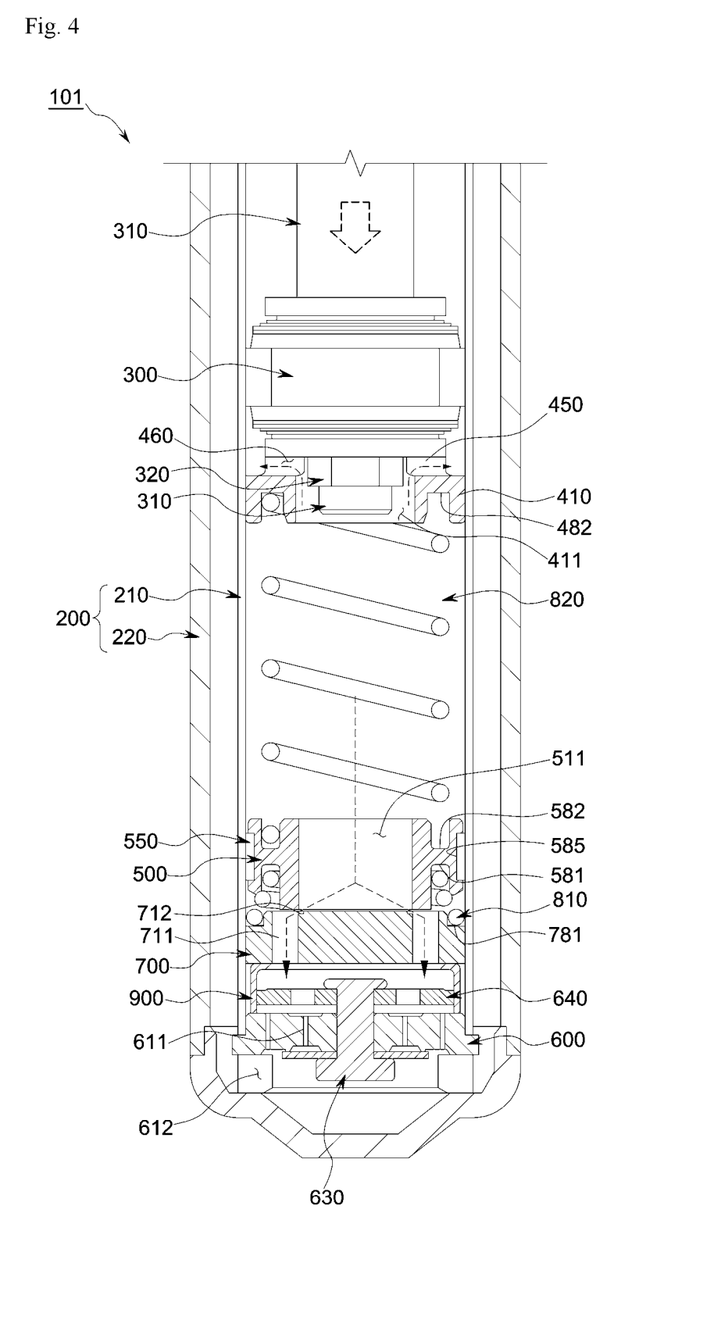
Figure 5:
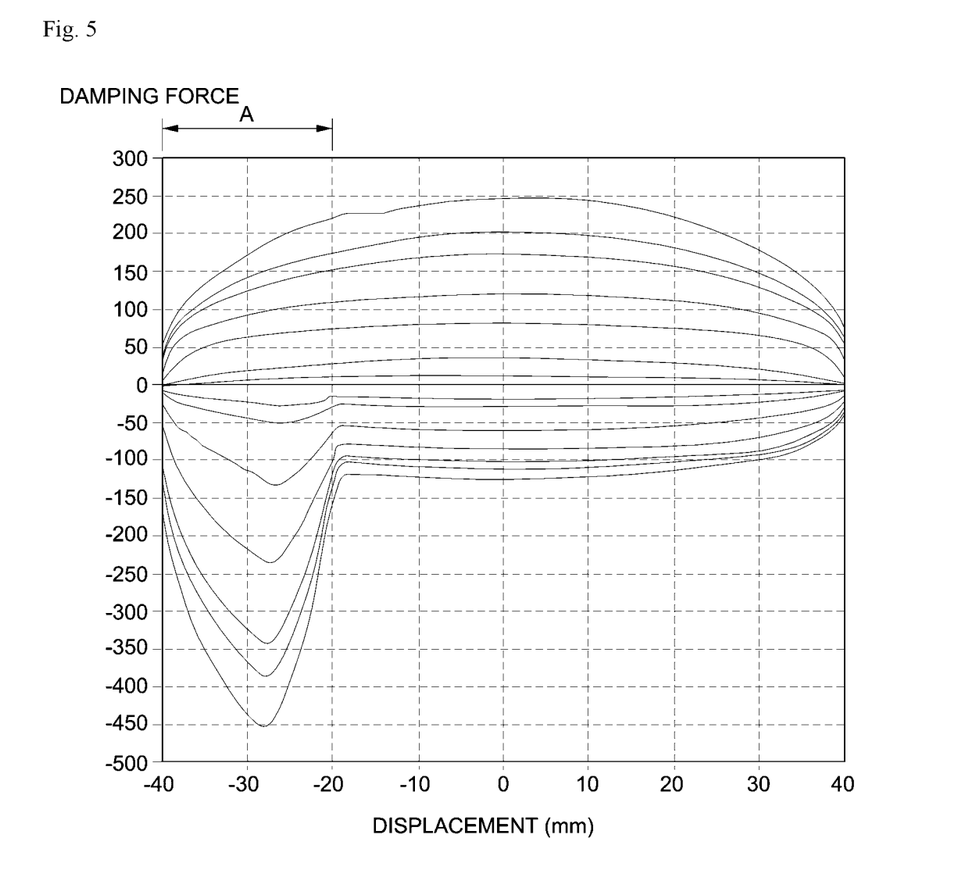
FIG. 5 is a graph illustrating a damping force of the shock absorber illustrated in FIG. 4.
Figure 6:
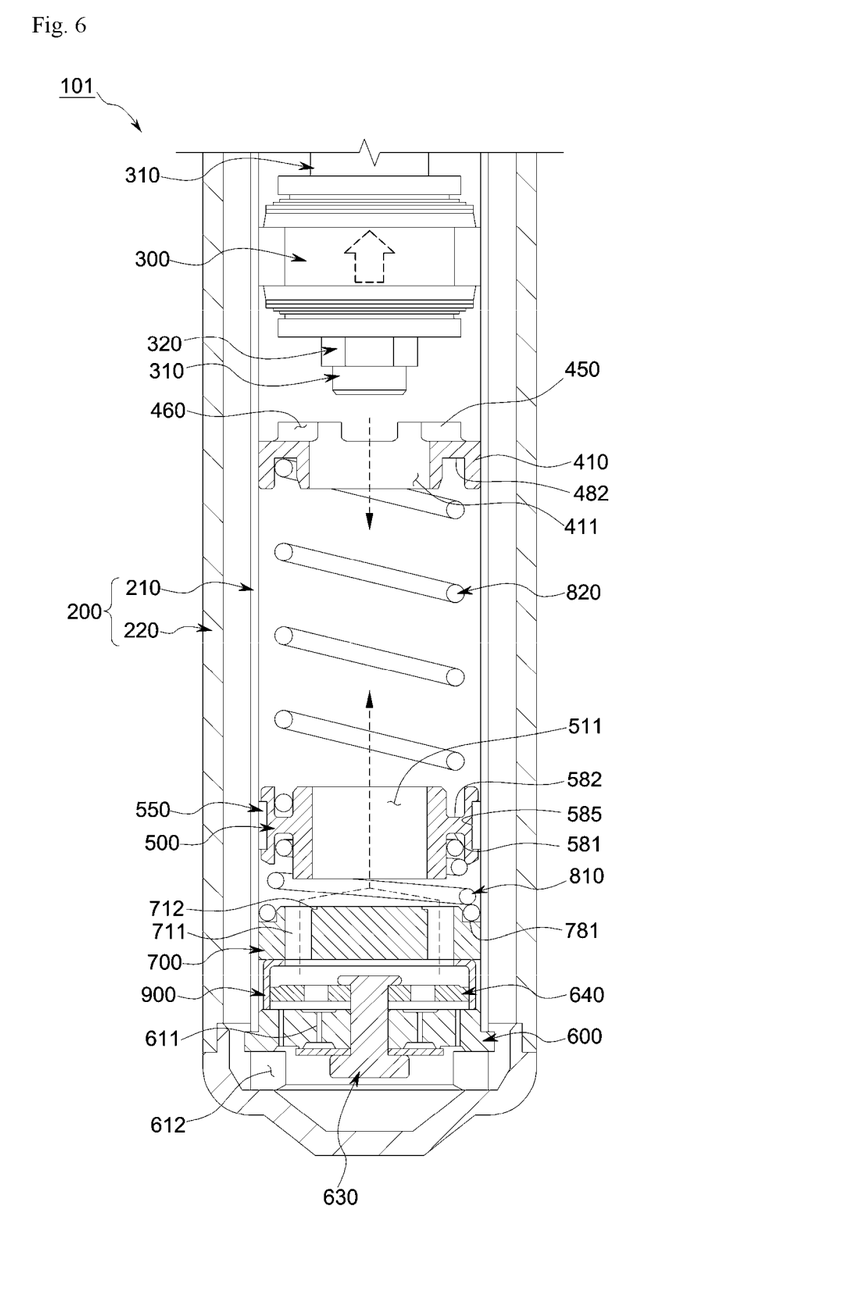
FIG. 6 is a cross-sectional view illustrating an extension process of the shock absorber illustrated in FIG. 1.

Hereinafter, an operational principle of the shock absorber 101 according to the embodiment of the present disclosure will be described in detail with reference to FIGS. 3 to 6. FIG. 3 illustrates an initial state of the compression process of the shock absorber 101, and FIG. 4 illustrates a late state of the compression process of the shock absorber 101. FIG. 5 is a graph illustrating a damping force of the shock absorber 101 according to the embodiment of the present disclosure. Further, FIG. 6 illustrates an extension process of the shock absorber 101.

First, as illustrated in FIG. 3, when the piston valve 300 begins to move downward during the compression process, the fluid in the compression chamber flows to the rebound chamber through the piston valve 300 or flows to the reserve chamber through the body valve 600.

In this case, the fluid existing in the region, in which the second elastic member 820 is disposed, flows to the rebound chamber via the piston valve 300 through the upper guide hole 411 of the upper guide member 400. When one end of the piston rod 310 is inserted into the upper guide hole 411 as the piston valve 300 moves downward, the upper guide protrusions 450 come into contact with the piston valve 300. Thereafter, the fluid existing in the region, in which the second elastic member 820 is disposed, flows through the upper guide flow paths 460 of the upper guide member 400.

The fluid existing in the region, in which the second elastic member 820 is disposed, flows to the reserve chamber via the body valve 600 through the lower through-holes 711 and the lower passing slits 712 of the lower guide member 700.

Next, as illustrated in FIG. 4, when the piston valve 300 continues to move downward during the compression process, the first elastic member 810 having a relatively small elastic modulus, i.e., a small spring constant is compressed first before the second elastic member 820 is compressed, and the mid-guide member 500 comes into contact with the lower guide member 700.

When the mid-guide member 500 comes into contact with the lower guide member 700 as described above, the lower through-holes 711 of the lower guide member 700 are closed by the mid-guide member 500. When the piston valve 300 continues to move downward in this state, the second elastic member 820 is also compressed, and the fluid existing in the region, in which the second elastic member 820 is disposed, flows to the reserve chamber via the body valve 600 only through the lower passing slits 712 of the lower guide member 700.

In this operating process, an area of the flow path formed in the lower guide member 700, through which the fluid passes, greatly decreases. Therefore, the hydraulic pressure applied to the compression chamber increases, and the damping force in the corresponding stroke greatly increases during the compression process.

FIG. 5 is a graph illustrating a damping force with respect to the displacement of the piston valve 300 of the shock absorber 101 according to the embodiment of the present disclosure. Specifically, section A illustrated in FIG. 5 corresponds to an operating state in which the first elastic member 810 is compressed, the mid-guide member 500 and the lower guide member 700 come into contact with each other, and the fluid flows through the lower passing slits 712 of the lower guide member 700, as illustrated in FIG. 4.

As illustrated in FIG. 5, it can be ascertained that the damping force greatly increases in section A indicating the state in which the mid-guide member 500 and the lower guide member 700 are in contact with each other.

Next, as illustrated in FIG. 6, when the mid-guide member 500 is moved away from the lower guide member 700 by the elastic force of the first elastic member 810 as the piston valve 300 moves upward during the extension process, the lower through-holes 711 of the lower guide member 700 may be opened, and the fluid may flow through the lower through-holes 711 and the lower passing slits 712.

As described above, during the extension process, the first elastic member 810 is restored, and the lower through-holes 711 of the lower guide member 700 are opened, such that the fluid may be naturally introduced. Therefore, it is possible to inhibit the occurrence of a negative pressure.

With this configuration, the shock absorber 101 according to the first embodiment of the present disclosure may increase the damping force and improve durability while having the simple configuration.

Specifically, the shock absorber 101 may implement the increased damping force while having the simple configuration including the piston valve 300, the body valve 600, the lower guide member 700, the mid-guide member 500, the first elastic member 810, and the second elastic member 820. Further, the entire configuration of the shock absorber 101 is simplified, which makes it possible to improve durability and ensure high productivity.

Since the elastic moduli of the first and second elastic members 810 and 820 may be selectively determined at the time of designing the shock absorber 101, it is possible to adjust the damping force of the shock absorber 101 only by changing the first and second elastic members 810 and 820.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A shock absorber comprising:
a tube having an interior filled with a fluid;
a piston valve configured to be movable upward and downward in the tube and having a flow path through which the fluid flows;
a body valve installed at a lower side of the tube and having a flow path through which the fluid flows;
a lower guide member installed between the piston valve and the body valve and comprising a lower through-hole through which the fluid passes, and a lower passing slit formed to allow the fluid to pass therethrough at a flow rate relatively lower than a flow rate at which the fluid passes through the lower through-hole;
a mid-guide member having a mid-guide hole through which the fluid passes, the mid-guide member being disposed to be movable upward and downward between the piston valve and the lower guide member and configured to close the lower through-hole when the mid-guide member is in contact with the lower guide member;
a first elastic member interposed between the lower guide member and the mid-guide member; and
a second elastic member interposed between the piston valve and the mid-guide member and having a relatively larger elastic modulus than the first elastic member.

2. The shock absorber of claim 1, wherein when the piston valve moves downward during a compression process, the fluid between the piston valve and the body valve flows to the flow path of the piston valve or flows to the flow path of the body valve through the lower through-hole and the lower passing slit of the lower guide member, and wherein when the mid-guide member comes into contact with the lower guide member as the first elastic member is compressed before the second elastic member is compressed as the piston valve moves downward, the lower through-hole of the lower guide member is closed, and the fluid flows to the flow path of the body valve through the lower passing slit.

3. The shock absorber of claim 2, wherein when the mid-guide member being in contact with the lower guide member is moved away from the lower guide member by an elastic force of the first elastic member as the piston valve moves upward during an extension process, the lower through-hole of the lower guide member is opened, and the fluid flows through the lower through-hole and the lower passing slit.

4. The shock absorber of claim 1, further comprising:
an upper guide member provided to be movable upward and downward between the piston valve and the second elastic member.

5. The shock absorber of claim 4, wherein the upper guide member comprises:
an upper guide body having an upper guide hole penetratively formed in a central portion thereof;
a plurality of upper guide protrusions protruding from one side of the upper guide body toward the piston valve so that the plurality of upper guide protrusions comes into contact with the piston valve; and
a plurality of upper guide flow paths formed between the plurality of upper guide protrusions.

6. The shock absorber of claim 5, further comprising:
a piston rod configured to support the piston valve and having one end protruding while penetrating the piston valve,
wherein at least a part of one end of the piston rod is inserted into the upper guide hole of the upper guide body.

7. The shock absorber of claim 6, wherein when the piston valve moves downward during a compression process, the fluid between the piston valve and the body valve flows to the flow path of the piston valve and the flow path of the body valve, and
wherein when the upper guide protrusion comes into contact with the piston valve and one end of the piston rod is inserted into the upper guide hole as the piston valve moves downward, the fluid flows to the flow path of the piston valve through the upper guide flow paths.

8. A shock absorber comprising:
a first tube having an interior filled with a fluid;
a piston valve provided to be movable upward and downward in the first tube and configured to divide the interior of the first tube into a compression chamber disposed at a lower side thereof and a rebound chamber disposed at an upper side thereof, the piston valve being configured to adjust a flow of the fluid between the compression chamber and the rebound chamber;
a second tube configured to surround the first tube and define a reserve chamber between the first tube and the second tube;
a body valve installed at the lower side of the first tube and configured to adjust a flow of the fluid between the compression chamber and the reserve chamber;
a lower guide member installed between the piston valve and the body valve and comprising a lower through-hole through which the fluid passes, and a lower passing slit formed to allow the fluid to pass therethrough at a flow rate relatively lower than a flow rate at which the fluid passes through the lower through-hole;
a mid-guide member having a mid-guide hole through which the fluid passes, the mid-guide member being disposed to be movable upward and downward between the piston valve and the lower guide member and configured to close the lower through-hole when the mid-guide member is in contact with the lower guide member;
a first elastic member interposed between the lower guide member and the mid-guide member; and
a second elastic member interposed between the piston valve and the mid-guide member and having a relatively larger elastic modulus than the first elastic member.

9. The shock absorber of claim 8, wherein when the piston valve moves downward during a compression process, the fluid in the compression chamber flows to the rebound chamber through the piston valve or flows to the reserve chamber via the body valve through the lower through-hole and the lower passing slit of the lower guide member, and
wherein when the mid-guide member comes into contact with the lower guide member as the first elastic member is compressed before the second elastic member is compressed as the piston valve moves downward, the lower through-hole of the lower guide member is closed, and the fluid flows to the reserve chamber through the lower passing slit.

10. The shock absorber of claim 9, wherein when the mid-guide member being in contact with the lower guide member is moved away from the lower guide member by an elastic force of the first elastic member as the piston valve moves upward during an extension process, the lower through-hole of the lower guide member is opened, and the fluid flows through the lower through-hole and the lower passing slit.

11. The shock absorber of claim 8, further comprising:
an upper guide member provided to be movable upward and downward between the piston valve and the second elastic member.

12. The shock absorber of claim 11, wherein the upper guide member comprises:
an upper guide body having an upper guide hole penetratively formed in a central portion thereof;
a plurality of upper guide protrusions protruding from one side of the upper guide body toward the piston valve so that the plurality of upper guide protrusions comes into contact with the piston valve; and
a plurality of upper guide flow paths formed between the plurality of upper guide protrusions.

13. The shock absorber of claim 12, further comprising:
a piston rod configured to support the piston valve and having one end protruding while penetrating the piston valve,
wherein at least a part of one end of the piston rod is inserted into the upper guide hole of the upper guide body.

14. The shock absorber of claim 13, wherein when the piston valve moves downward during a compression process, the fluid in the compression chamber flows to the rebound chamber and the reserve chamber, and
wherein when the upper guide protrusion comes into contact with the piston valve and one end of the piston rod is inserted into the upper guide hole as the piston valve moves downward, the fluid flows to the rebound chamber through the upper guide flow path.

15. The shock absorber of claim 11, wherein the upper guide member has a first upper support groove configured to support one end of the second elastic member, and the mid-guide member has a second upper support groove configured to support the other end of the second elastic member.

16. The shock absorber of claim 8, wherein the lower guide member has a first lower support groove configured to support one end of the first elastic member, and the mid-guide member has a second lower support groove configured to support the other end of the first elastic member.

17. The shock absorber of claim 8, wherein the first elastic member and the second elastic member are coil springs disposed in series.

18. The shock absorber of claim 8, wherein the first elastic member is a coil spring having a diameter that decreases in a direction from one end of the first elastic member, which is in contact with the lower guide member, to the other end of the first elastic member, which is in contact with the mid-guide member.

19. The shock absorber of claim 8, further comprising:
a piston ring disposed on an outer peripheral surface of the mid-guide member.

20. The shock absorber of claim 19, wherein a ring accommodation groove is formed in the outer peripheral surface of the mid-guide member, and the piston ring is inserted into the ring accommodation groove.

21. The shock absorber of claim 8, further comprising:
a base tube configured to maintain a spacing distance between the lower guide member and the body valve.

22. The shock absorber of claim 8, wherein the lower passing slit is recessed in one surface of the lower through-hole.

23. The shock absorber of claim 22, wherein the lower through-hole of the lower guide member is provided in the form of a long hole having an arc shape, and the lower passing slit is formed in one surface of the lower through-hole in a direction of a center of the arc shape of the lower through-hole.

* * * * *